(12) United States Patent
Clark, Jr.

(10) Patent No.: US 7,735,455 B2
(45) Date of Patent: Jun. 15, 2010

(54) HEATED POULTRY FOUNTAIN

(75) Inventor: Benjamin T. Clark, Jr., South Bend, IN (US)

(73) Assignee: Farm Innovators, Inc., Plymouth, IN (US)

(*) Notice: Subject to any disclaimer, the term of this patent is extended or adjusted under 35 U.S.C. 154(b) by 73 days.

(21) Appl. No.: 11/784,663

(22) Filed: Apr. 9, 2007

(65) Prior Publication Data

US 2008/0245308 A1    Oct. 9, 2008

(51) Int. Cl.
*A01K 7/00* (2006.01)

(52) U.S. Cl. .......................... 119/73; 119/74

(58) Field of Classification Search ............... 119/72, 119/72.5, 73, 74; 220/566, 592.01; 222/146.2
See application file for complete search history.

(56) References Cited

U.S. PATENT DOCUMENTS

| | | | | | |
|---|---|---|---|---|---|
| 769,942 | A | * | 9/1904 | Eisold | 119/71 |
| 1,358,245 | A | * | 11/1920 | Pruden | 119/73 |
| 1,458,450 | A | * | 6/1923 | Unger et al. | 119/73 |
| 1,673,814 | A | * | 6/1928 | Edington | 119/73 |
| 1,922,612 | A | * | 8/1933 | Barker | 119/77 |
| 2,573,802 | A | * | 11/1951 | Mitchell | 119/77 |
| 2,584,383 | A | * | 2/1952 | Feck | 119/77 |
| 3,170,439 | A | * | 2/1965 | Juenger | 119/73 |
| 4,164,201 | A | | 8/1979 | Vanderhye | |
| 4,421,061 | A | | 12/1983 | Shomer | |
| 4,527,513 | A | | 7/1985 | Hart et al. | |
| 4,703,721 | A | | 11/1987 | Uri | |
| 5,345,063 | A | * | 9/1994 | Reusche et al. | 219/441 |
| 6,363,886 | B1 | * | 4/2002 | Statton | 119/51.5 |

* cited by examiner

*Primary Examiner*—Kimberly S Smith
(74) *Attorney, Agent, or Firm*—R. Tracy Crump (57) ABSTRACT

A ground supported poultry fountain includes a basin with an annular drinking trough, a bell shaped reservoir detachable mounted atop the basin and a heating element affixed to the bottom of the basin. The heating element covers the bottom surface of the basin under the reservoir and along the inner wall of the drinking trough. The heating element prevents the water in the reservoir, as well as the water in the trough from freezing when ambient temperatures drop below freezing.

7 Claims, 11 Drawing Sheets

HEATED POULTRY FOUNTAIN

BACKGROUND AND SUMMARY OF THE INVENTION

Ground supported drinking fountains are commonly used to provide water to poultry. A conventional poultry drinking fountain includes a basin with an annular drinking trough and an upright reservoir seated atop the basin. Water in the reservoir is gravity fed into an annular basin and metered by vacuum pressure within the reservoir tank. The drinking trough is located at the bottom of the fountain so that the water level is accessible to poultry of all sizes.

Poultry fountains of this type are often used in outdoor environments and are often rendered useless when ambient temperatures drop below freezing because the water in the trough and reservoir freezes. Heretofore, the solution for this freezing problem has been to sit the fountain on a separate heated base or platform. The heated base includes an electrical heating element that warms the water in the fountain to prevent freezing. Separate heated bases are effective down to ambient temperatures around 10° F. While the use of heated bases prevents freezing, they are only effective to ambient temperature around 10° F. and can only be used with metal fountains, because the high wattage heating element must heat surface of the base to approximately 320° F., which would melt plastic fountains and may present a potential fire hazard under certain conditions. In addition, placing the fountain atop the base also raises the height of the drinking trough making the water inaccessible to smaller poultry.

The present invention incorporates a heating element into the basin to prevent water from freezing in the drinking trough and the reservoir without raising the height of the drinking trough. One embodiment of the heated poultry fountain of the present invention includes a basin with an annular drinking trough, a bell shaped reservoir detachable mounted atop the basin and a heating element affixed to the bottom of the basin. The heating element covers the bottom surface of the basin under the reservoir and along the inner wall of the drinking trough. Accordingly, the heating element prevents the water in the reservoir, as well as the water in the trough from freezing when ambient temperatures drop below freezing. The integrated heating element into the fountain design eliminates the need for a separate heated platform, which raises the height of the drinking trough making water inaccessible to all sizes of poultry.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Referring now to the drawings, reference numeral 10 generally designates an embodiment of the heated poultry fountain of the present invention. Fountain 10 includes four base components: a basin 20; a bell shaped reservoir 30; a heating element 40 and a bottom basin cover 50. Except for the electrical heating element and associated components, the fountain components are ideally constructed of a plastic, such as high-density polyethylene, but may be constructed of sheet metals, such as stainless steel or tin.

Basin 20 is dimensioned and weighted with sufficient mass to prevent the fountain from tipping over. Basin 20 has a flat circular top 22 and an annular peripheral trough 23 defined by integral parabolic outer and inner walls 24 and 26. Basin trough 23 provides an accessible drinking area for the poultry. Four L-shaped retaining mounts 28 extend upward from and radially around the basin top 22. Six support posts 29 extend downward from the bottom face of basin top 22, which help support the weight of the fountain when filled with water.

Reservoir 30 is a bell shaped vessel or tank, whose sidewall 32 defines a hollow interior 31 with an open end 33. As shown, reservoir sidewall 32 of reservoir 30 terminates in a bottom brim 34 at open end 33 and converges to enclose the opposite end. Reservoir 30 includes four external support legs 36, which extend upward at the top of reservoir 30. Legs 36 are used to support the reservoir in the up-side down position when filling the reservoir with water. A fold down handle 12 is mounted between two of legs 36, which allows fountain 10 to be carried. As shown, four mounting flanges 38 extend radially along the bottom brim 34 of reservoir 30. Each mounting flange 38 terminates in a flat foot 39, which seats under retaining mounts 28 to secure reservoir 30 to basin 20. Reservoir sidewall 32 also has a plurality of notches formed along brim 34, which act as flow vents 35 that allow water to flow from reservoir interior 31 into trough 23.

Figure 1:
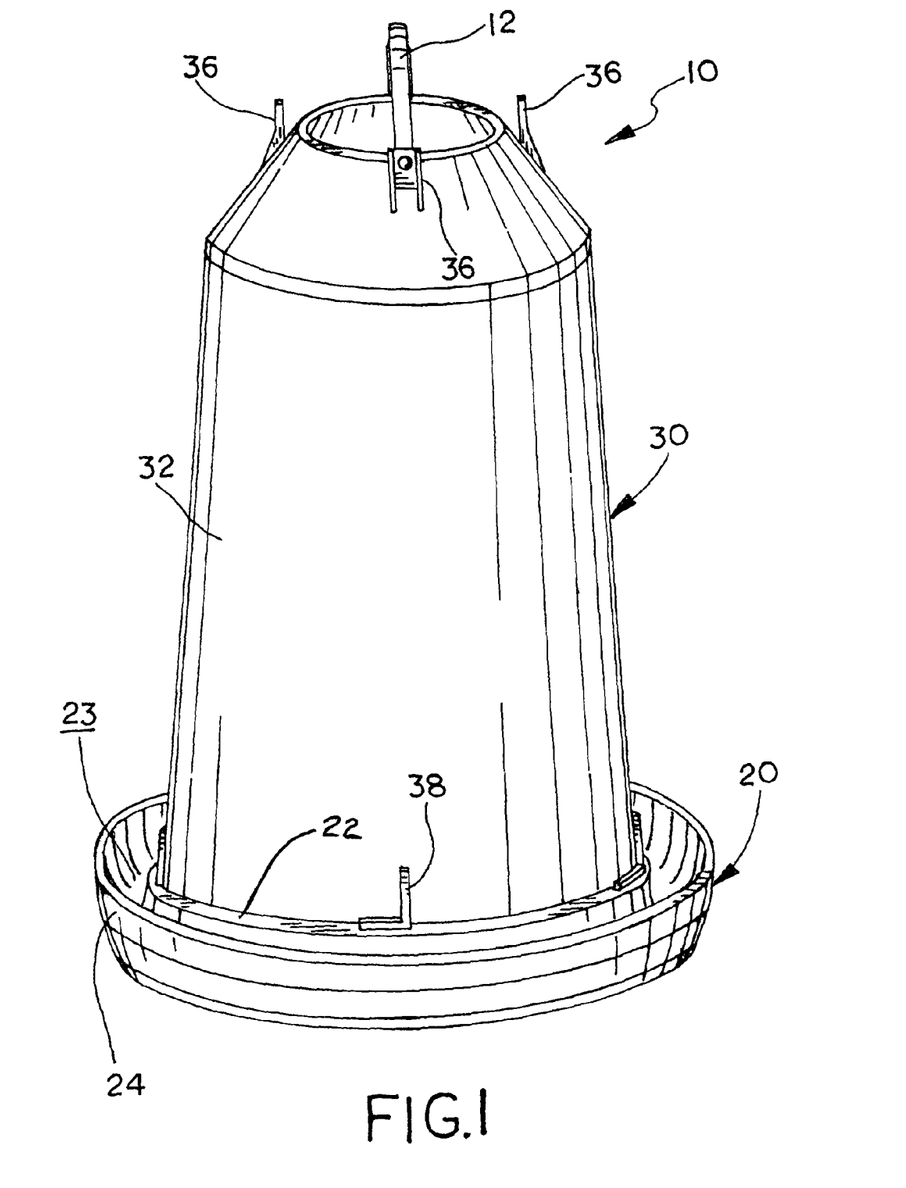
FIG. 1 is a perspective view of an embodiment of the poultry fountain of the present invention.
Figure 2:
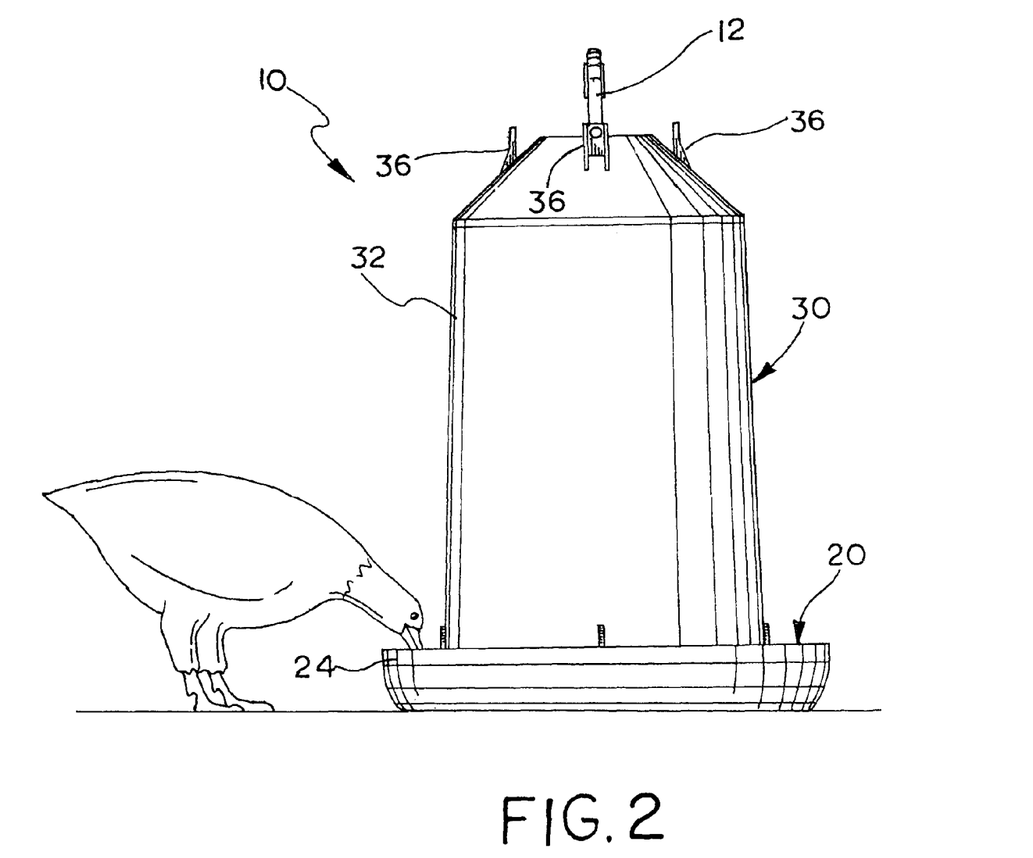
FIG. 2 is a perspective view of the poultry fountain of FIG. 1 shown in use.
Figure 3:
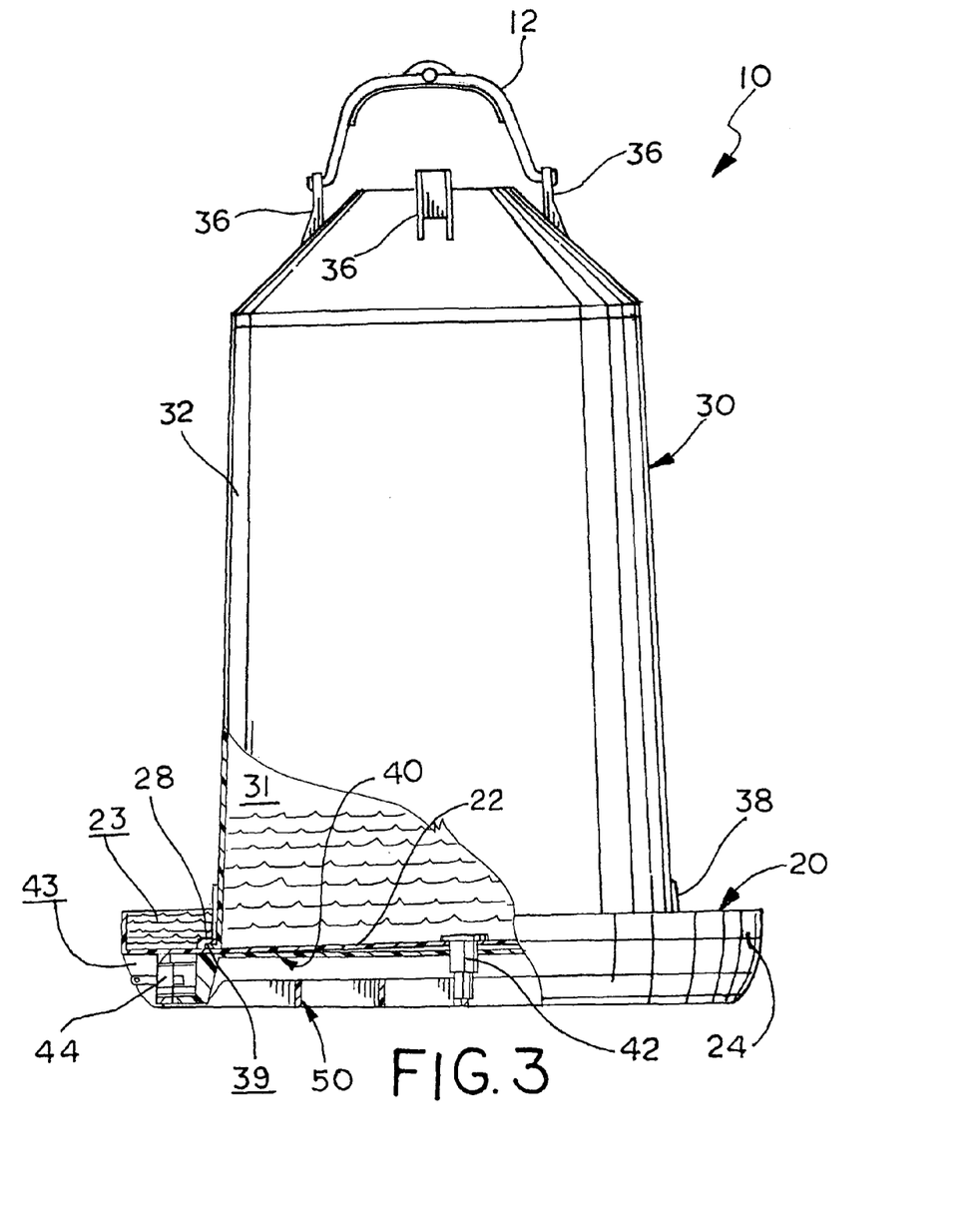
FIG. 3 is a side view of the poultry fountain of FIG. 1 with a partial cutaway view showing the receptacle plug.
Figure 4:
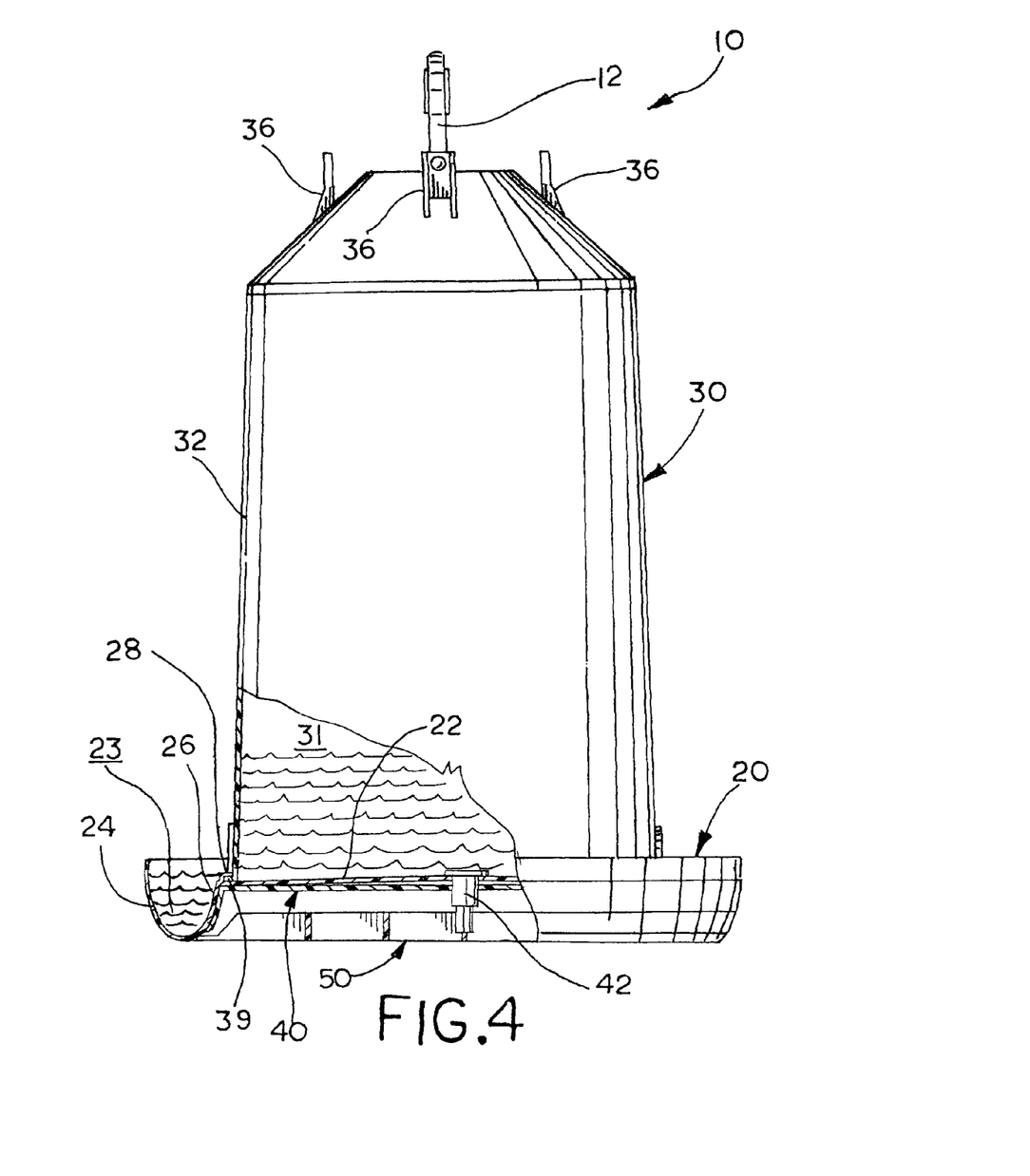
FIG. 4 is another side view of the poultry fountain of FIG. 1 with a partial cutaway view showing the connection of the reservoir and basin.
Figure 5:
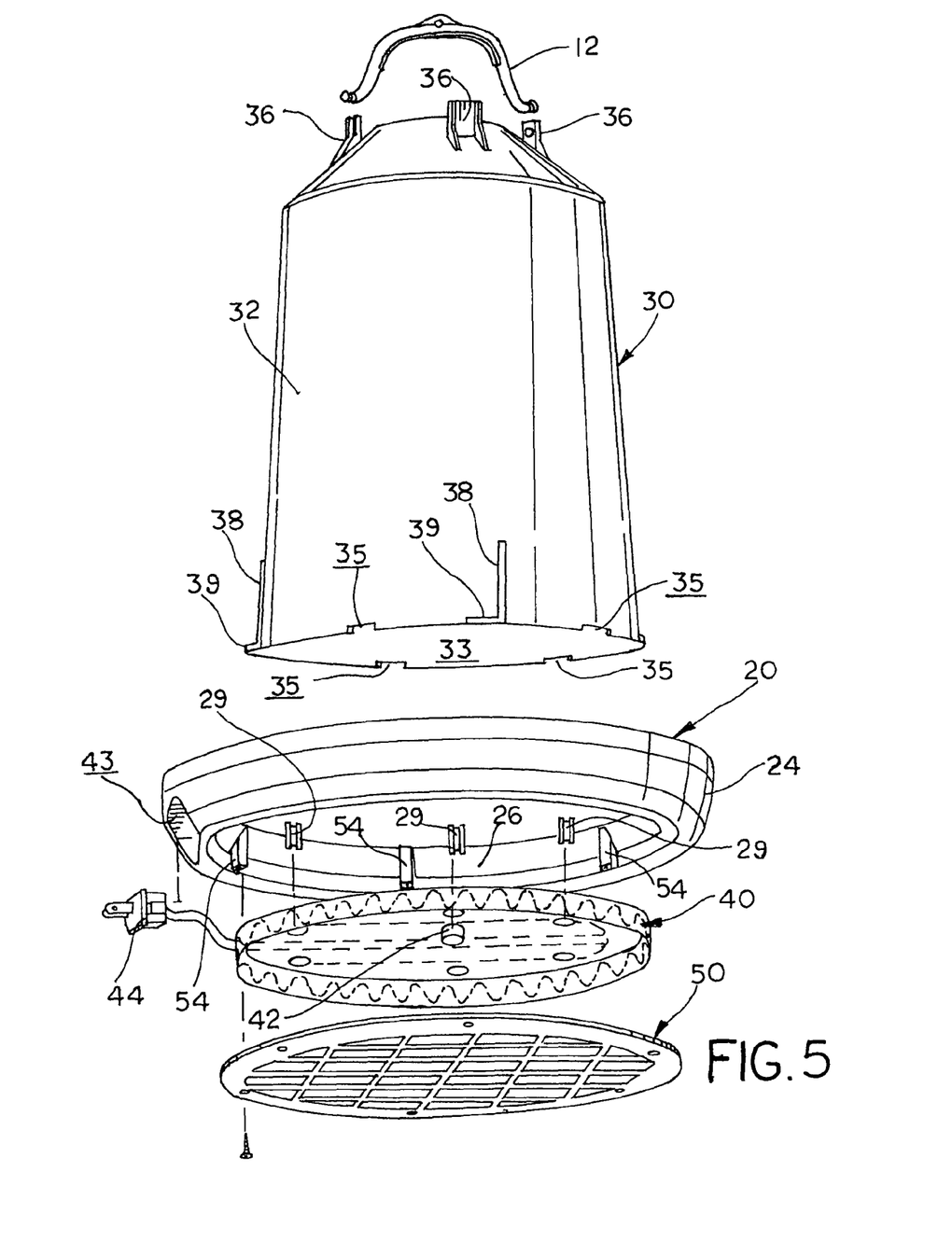
FIG. 5 is an exploded view of the poultry fountain of FIG. 1.
Figure 6:
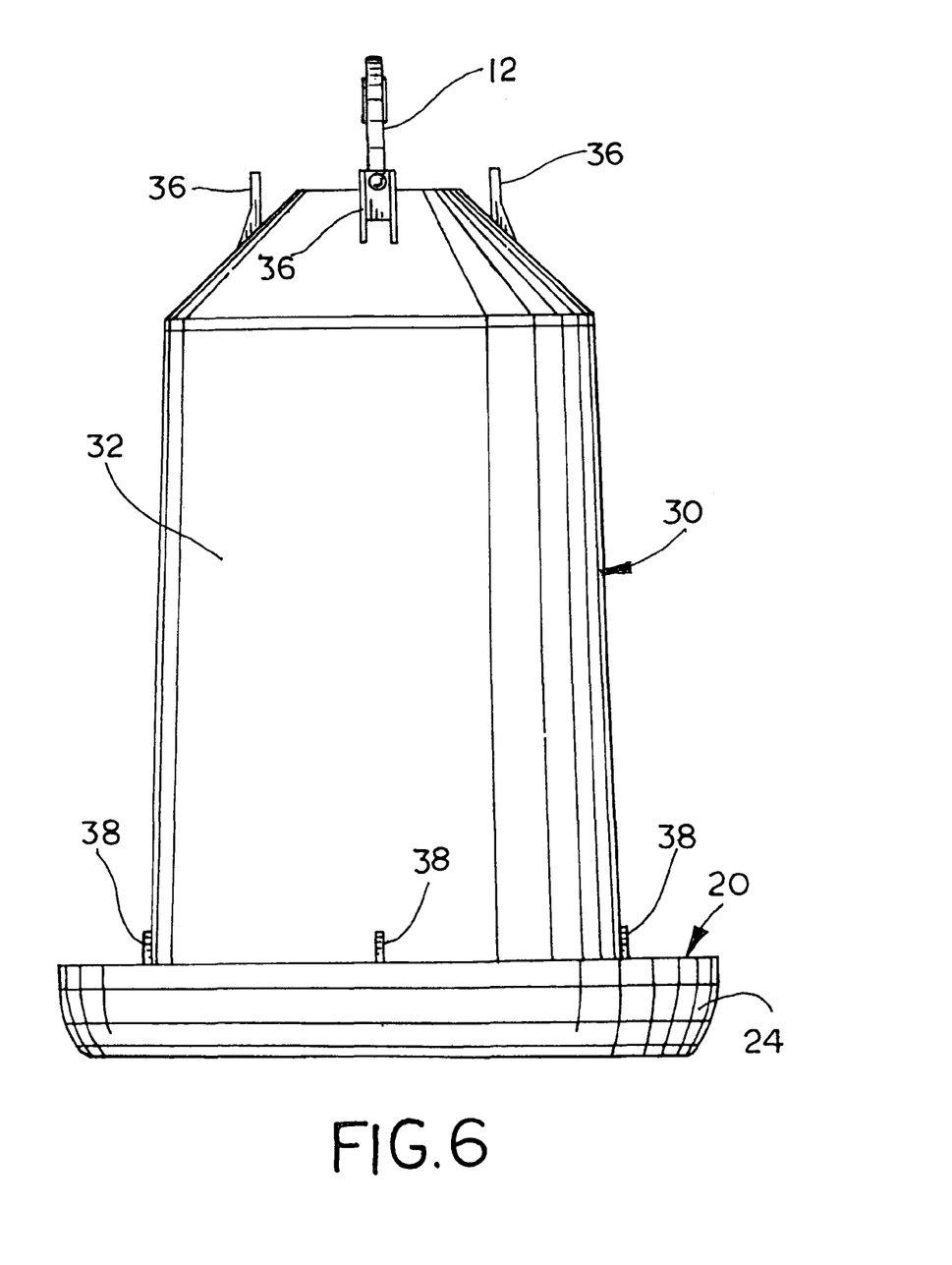
FIG. 6 is a front view of the poultry fountain of FIG. 1.
Figure 7:
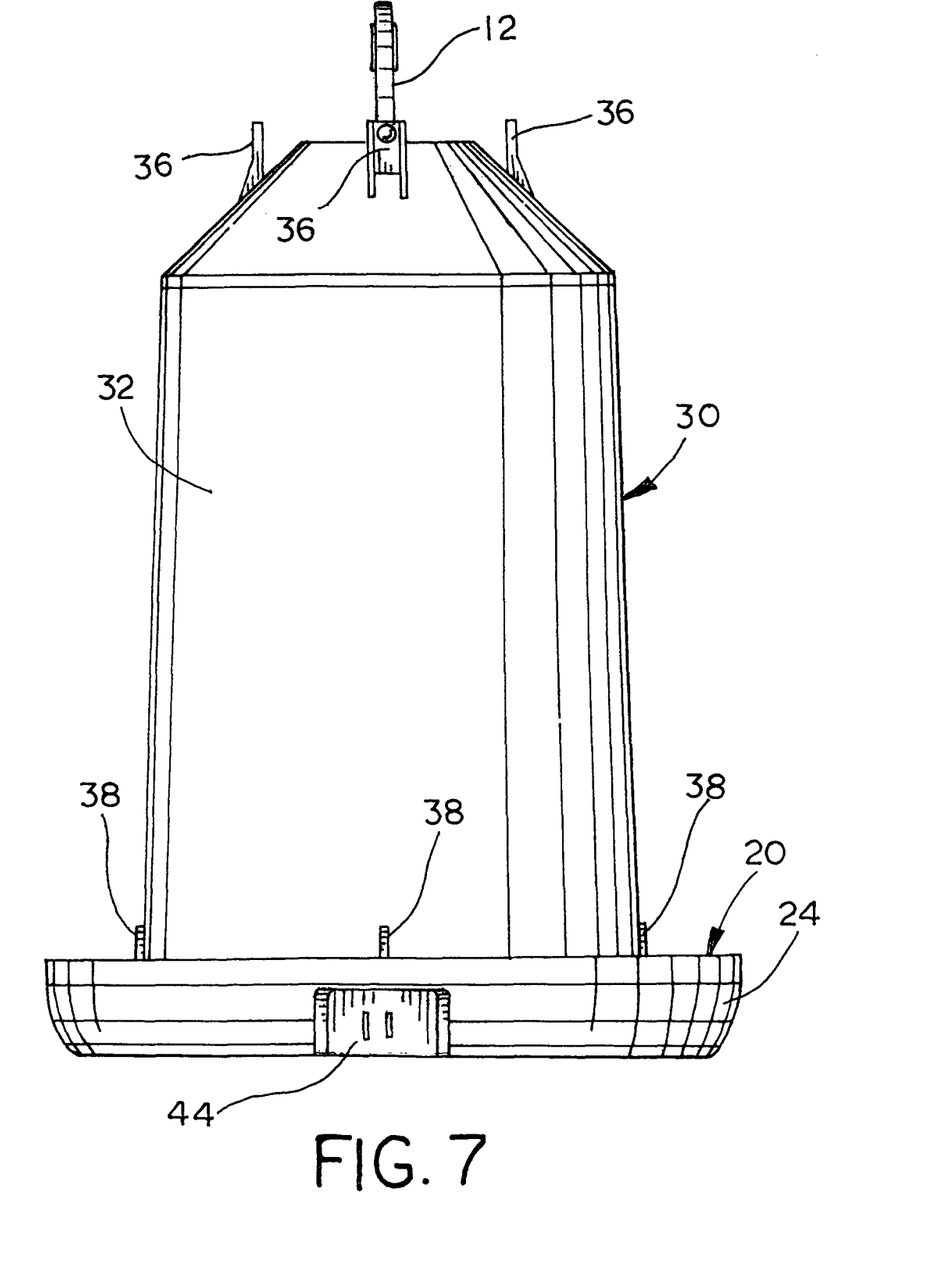
FIG. 7 is a rear front view of the poultry fountain of FIG. 1.
Figure 8:
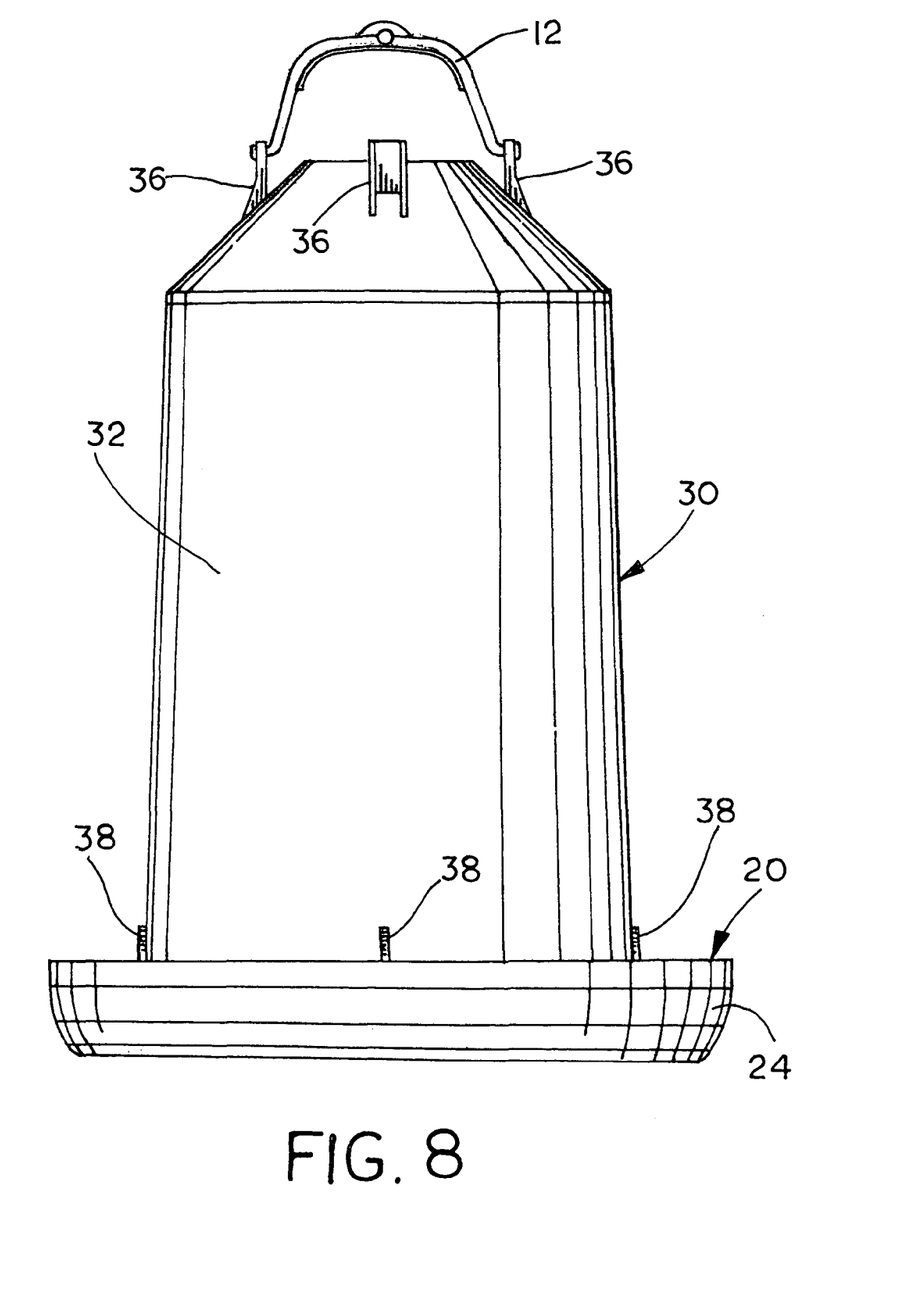
FIG. 8 is a left side view of the poultry fountain of FIG. 1.
Figure 9:
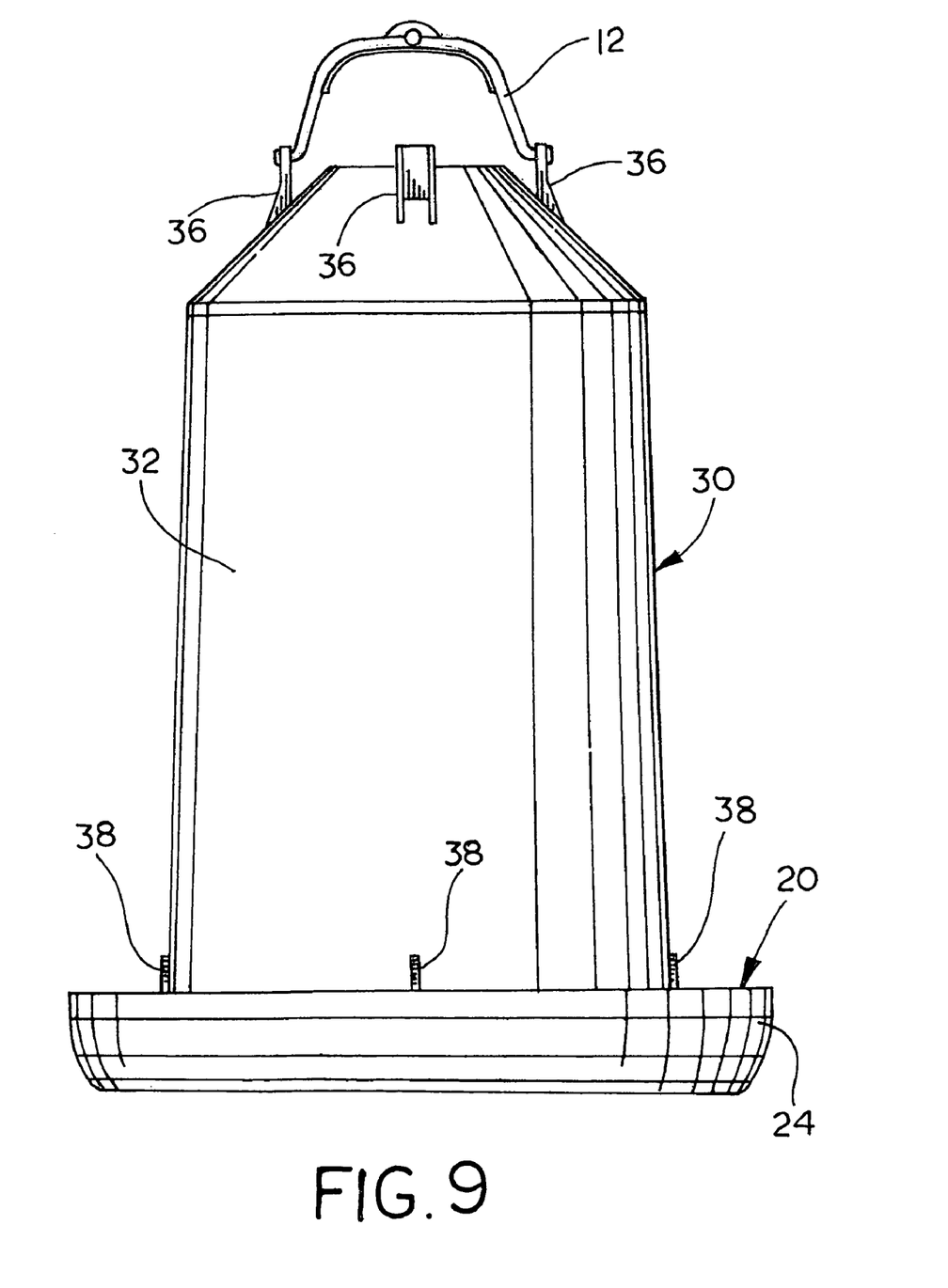
FIG. 9 is a right side view of the poultry fountain of FIG. 1.
Figure 10:
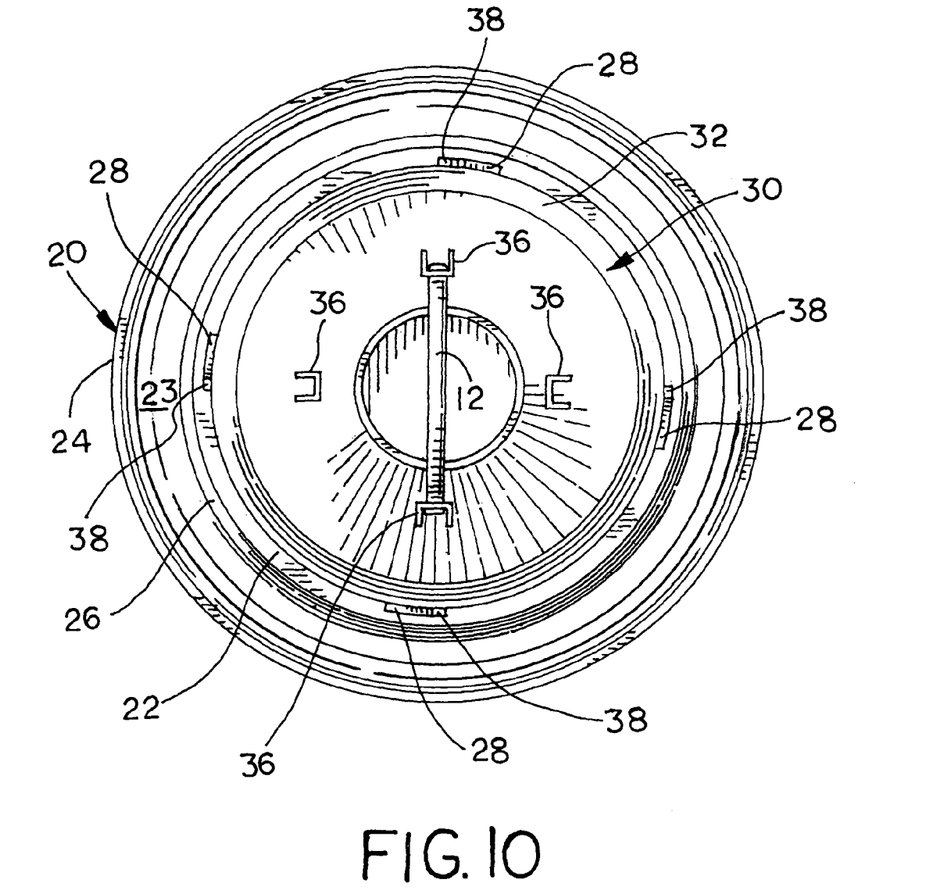
FIG. 10 is a top view of the poultry fountain of FIG. 1.
Figure 11:
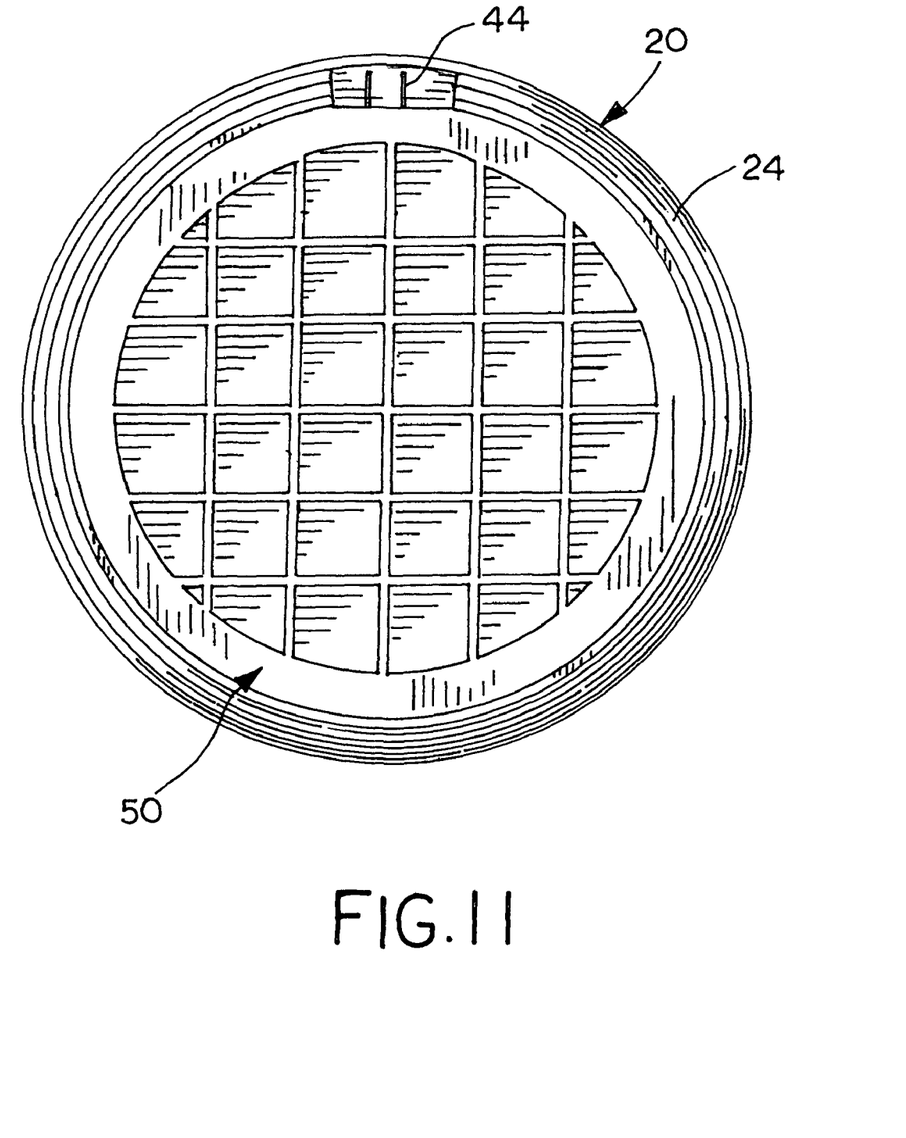
FIG. 11 is a bottom view of the poultry fountain of FIG. 1.

Heating element 40 is mounted to the bottom of basin 40 and covers the bottom surface of basin top 22 and extends over inner wall 26 of basin 20. Heating element 40 emits thermal energy to heat basin 20, which heats the water inside trough 23, as well as the water inside reservoir 31. Heating element 40 has six holes 41, through which support posts 29 extend. Heating element 40 is a foil type electric heater and includes a length of electrical resistance heating wire 44 affixed to a backing of a thin sheet of pliable thermal conductive foil material 46. Heating element 40 also includes a thermostat 42, which is centrally mounted against the bottom of basin top 22. Thermostat 42 uses a conventional snap action bimetal design, although other types of thermostats may be used within the teachings of this invention. As shown in FIG. 3, basin 20 has a recess cavity 49 formed in outer sidewall 24, which houses an electrical plug receptacle 48. Plug receptacle 48 is electrically wired to heating element 40 and thermostat 42. A conventional electrical cord (not shown) is used to connect fountain 10 to an AC electrical power source. Although heating element 40 is preferably powered by a common AC electrical source, the heating element can be modified for DC electrical power within the teachings of this invention.

It should be noted that heating element 40 employs approximately 3.25-3.75 linear feet of heating wire and the heating wire has a resistance value ranging generally between 100-200 ohms per foot of wire. At least forty percent (40%) of the total length of heating wire 44 is used in the portion of heating element 40 covering basin inner sidewall 26. While covering a proportionately smaller area, more resistance heating wiring 44 is used in the portion of the heating element 40 covering the basin inner sidewall 26 than in the portion of the heating element covering basin top 22. Concentrating more heating wire 44 in the area of the heating element 40 covering basin inner sidewall 26 helps ensure that water inside trough 23, which is directly exposed to wind and ambient air, will not freeze even in sub zero temperatures.

Bottom cover 50 encloses the bottom of basin 20 and protects heating element 40 and thermostat 42. Cover plate 50 is secured to basin 20 by screws 52 that extend through holes in the cover and extend into boss posts 54 formed in the inner sidewall 26 of basin 20.

Fountain 10 is filled with water by first detaching reservoir 30 from basin 20. Reservoir 30 is then flipped upside down so that the reservoir rests on support legs 36. Once reservoir 30 is filled with water, basin 20 is reattached. With basin 20 centered atop the open end of reservoir 30, the basin is rotated so that the feet 39 of mounting flanges 38 on the reservoir slide into engagement under L-shaped retaining mounts 28, which secure the basin to the reservoir. With basin 20 reattached to reservoir 30, fountain 10 is flipped back upright ready for use. The water supply within trough 23 is gravity fed and maintained by vacuum pressure within reservoir interior 31. When fountain 10 is upright, water flows from reservoir 30 through flow vents 35 to fill trough 23. Because flow vents 35 are positioned below the top of the outer sidewall 24 of basin 20, the vacuum pressure within reservoir 30 maintains the water level in trough 23 at the top of the flow vents. With the water level above flow vents 35, a vacuum seal is created within reservoir interior 31, which prevents the water from running out the upright reservoir. When the water level in trough 23 drops below the top of flow vents 35, air enters reservoir 30 breaking the vacuum seal and releasing water into the trough, thereby automatically regulating the water supply.

One skilled in the art will note several advantages of the poultry fountain embodying the present invention. The plastic construction of the fountain provides a durable light weight fountain. The large volume reservoir is ideal for large poultry operations. The vacuum sealed gravity feed design of the fountain automatically regulates water level in the basin without complicated valves.

The integrated heating element into the fountain design eliminates the need for a separate heated base or platform, which raises the height of the drinking trough making water inaccessible to small poultry. Because the heating element is incorporated into the basin, the water in the trough is accessible to all sizes of poultry. The fountain is designed to operate even in sub zero temperatures. The heating element prevents the water in the reservoir, as well as the water in the trough from freezing when ambient temperatures drop well below freezing. Concentrating at least forty percent of the heating element's resistance heating wire in the portion of the heating element covering the inner wall of the trough, ensures a more efficient distribution of thermal energy to the basin and reservoir, thereby making the operation of the fountain more cost efficient.

The thermostat controls the heating element to conserve power when temperatures are above freezing. The detachable electrical cord allows the fountain to be conveniently used in all seasons. Detaching the electrical cord from the integrated receptacle plug, which is housed in the basin, prevents the cord from being soiled or damaged during warm seasons when the heating element is not in use.

The poultry fountain embodying the present invention described and illustrated herein is not intended to be exhaustive or to limit the invention to the precise form disclosed. It is presented to explain the invention so that others skilled in the art might utilize its teachings. The embodiment of the present invention may be modified within the scope of the following claims.

I claim:

1. A poultry fountain comprising:
    a basin having a flat top and an annular peripheral trough for receiving water to be made available for drinking by poultry the annular trough having an inner sidewall and an outer sidewall integrally connected at a trough bottom, the trough inner sidewall contiguously extending around and below the basin top so that the basin top is elevated above the trough bottom and the trough outer sidewall terminating in a peripheral edge positioned above the basin top;
    a reservoir for storing water to be made available in the trough, the reservoir having an interior therein defined by a sidewall and open end defined by a sidewall brim, the reservoir being detachably mountable to the basin top inset laterally from the trough inner sidewall so that the basin top overlies and covers the reservoir open end; and
    a heating element affixed to the basin for emitting thermal energy, the heating element having a first portion having a first length of electrical resistance wire underlying and contacting the basin top for warming the water inside the reservoir interior and a second portion having a second length of electrical resistance wire extending below and circumscribed around said first portion and contacting and the inner sidewall for warming the water within the trough to prevent the surface of the water from freezing.

2. The fountain of claim 1 and a thermostat mounted to the basin and electrically connected to the heating element for regulating the thermal energy from the heating element.

3. The fountain of claim 1 wherein the second length of resistance wire is at least forty percent longer than the first length of resistance wire.

4. The fountain of claim 3 wherein the length of resistance wire is affixed to a sheet of thermal conductive backing.

5. The fountain of claim 1 wherein the reservoir sidewall has a vent through which water from the reservoir interior flows into the trough.

6. The fountain of claim 1 wherein the basin and the reservoir are constructed of plastic.

7. A poultry fountain comprising: a basin having a flat top and an annular peripheral trough for receiving water to be made available for drinking by poultry, the annular trough having an inner sidewall and an outer sidewall integrally connected at a trough bottom, the trough inner sidewall contiguously extending around and below the basin top so that the basin top is elevated above the trough bottom and the trough outer sidewall terminating in a peripheral edge positioned above the basin top;
    a reservoir for storing water to be made available in the trough, the reservoir having an interior therein defined by a sidewall and open end defined by a sidewall brim, the reservoir being detachably mountable to the basin top inset laterally from the trough inner sidewall so that the basin top overlies and covers the reservoir open end;

a heating element affixed to the basin, the heating element includes a length of electrical resistance wire affixed to a sheet of thermal conductive backing, the heating element also having a first portion underlying and contacting the basin top for warming the water inside the reservoir interior and a second portion extending below and circumscribed around the first portion and contacting and the inner sidewall for warming the water within the trough to prevent the surface of the water from freezing, the first portion of the heating element includes a first length of electrical resistance wire and the second portion of the heating element includes a second length of electrical resistance wire, the second length of resistance wire is at least forty percent longer than the first length of resistance wire; and a thermostat mounted to the basin and electrically connected to the heating element for regulating the thermal energy from the heating element.

* * * * *